United States Patent Office 3,338,200
Patented Aug. 29, 1967

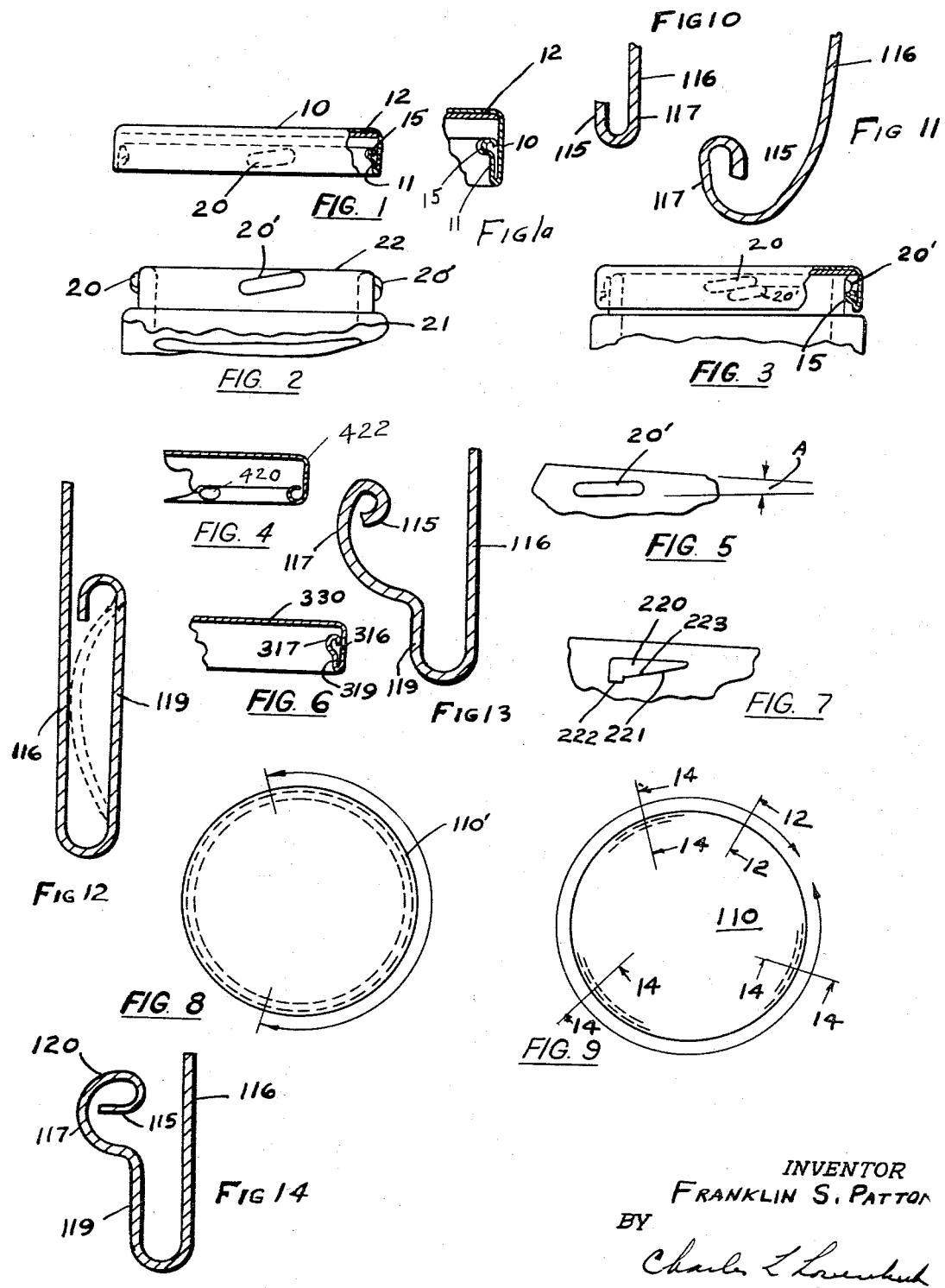

3,338,200
ONE PIECE LUG CAP
Franklin S. Patton, Erie, Pa., assignor to Sterling Seal Company, Erie, Pa., a corporation of Pennsylvania
Original application Oct. 2, 1961, Ser. No. 142,348, now Patent No. 3,150,789, dated Sept. 29, 1964. Divided and this application Sept. 29, 1964, Ser. No. 399,925
2 Claims. (Cl. 113—121)

This invention relates to closure caps, and, more particularly, to closure caps of the screw type and for methods of making the same.

This application is a divisional application of patent application, Ser. No. 142,348, filed Oct. 2, 1961, and now Patent No. 3,150,789, issued on Sept. 29, 1944.

Screw threads or screw lugs have been formed in the skirts of caps by rolling or striking inwardly the skirt of the cap to form the threads or lugs at the desired position. The threads lugs were visible from the exterior of the cap which spoiled the appearance. Lugs were sometimes formed on an inwardly turned bead by distorting the bead itself. This was usually done at a point on the bead so close to the neck of the glass jar that with varying sizes of glass, the lug would not force the paper liner of the cap into sealing engagement with the mouth of the jar. If the lugs were put lower, this necessitated putting corresponding threads on the glass so near the neck of the jar that it was difficult to finish the glass.

In the present invention, a curl is formed on the cap and the curl is forced outward at the lower part of the curl to form the lugs. By making the lug up inside the cap and at an angle, the finish on the glass may be a reasonable distance up from the shoulder whereas with previous caps, the lugs on the glass had to be down close to the shoulder.

In other caps, if the liner varies or any variation is encountered in the cap or the glass, the liner does not engage the cap. In the present invention, the angle of the lug in conjunction with the angle of the glass finish improves the operation of the cap and constitutes an advantage. This structure allows for much wider tolerances in cap and glass manufacture.

In some other caps, due to the limited range of sealing position, variations in the caps or jars may result in insufficient compression of the liner and incomplete sealing.

The cap disclosed herein continues to turn until the seal is made, regardless of the position of the lugs in the cap or the lugs in the glass or any variation in the liner. Considering a normal defect in jars such as saddles on the sealing surface, the cap disclosed herein shifts and allows itself to seat. A straight lug would get down and contact the shoulder of the jar and the cap could not go further. When this is done, the bead may be too close to the shoulder of the glass jar and the lugs of the cap may not pull it down to force the cap liner into sealing engagement with the mouth of the jar. If the lugs are low, the corresponding threads on the glass are so near the shoulder of the jar that it is difficult to finish the glass. If the glass is too high, the skirt of the cap will not contact the lugs of the jar and make a seal.

The cap disclosed herein will have a lower torque requirement to seat it and thus seal, yet will have the same removal torque as previous caps applied with higher torque. Due to the lug design and glass design, the previous caps had to be applied with a higher torque. They also had an extremely high removal torque to move the lug out of engagement with the jar, resulting in breaking the lugs.

The present cap may be applied to a jar more quickly than previous caps. The closer the angles of the glass and the lug are to being flat, the closer an equalized application and removal torque whereas in the case of previous caps, they have had to wedge on and if anything happens in one particular lug and if does not contact the glass, a difference and irregularity result. Therefore, a high application torque is necessary to insure that the position of the lug in the present cap is up and beyond the normal internal radius of any curl in the member; that is, up beyond the open end.

In previous caps, the lugs are formed on the internal point of the curl. In considering broken threads or double shells, the threads engage only about sixty percent of the circumference. The engagement in the cap herein against glass is one hundred percent. In continuous threads, this would only be possible by making the thread on the jar longer than one turn which would mean a much higher glass.

Another advantage of the present invention is that since the lug is considerably up inside the cap, the portion on which the lug is squeezed out can be controlled and, therefore, the internal part of the cap which is touching the side wall of the jar can be controlled. In other words, the structure can be made flexing and the rigidity or springiness of the cap construction can be controlled which is not possible in previous devices.

Further, since the cap lugs are at an angle and up inside the cap, they allow for more lead. That is, the cap drops further onto the container and onto the finish of the container.

It is, accordingly, an object of the present invention to provide an improved lug on a cap.

Another object of the invention is to provide an improved tapered lug on a cap which is simple in construction, economical to manufacture, and simple and efficient to use.

A further object of the invention is to provide an improved lug formed on an inturned bead of a cap.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit thereof or from the scope of the appended claims.

In the drawing:

FIG. 1 is a side view of a cap partly in cross section according to the invention;

FIG. 1a is an enlarged partial cross sectional view of the cap shown in FIG. 1;

FIG. 2 is a view of the upper part of a glass jar suitable for receiving the lug cap shown in FIG. 1;

FIG. 3 shows the improved cap of FIG. 1 in position on a jar;

FIG. 4 is a cross sectional view of the cap shown in FIG. 1 taken at a position away from the lug;

FIG. 5 is a view of part of a glass jar and lug such as shown in FIG. 2;

FIG. 6 is a view of a cap similar to that shown in FIG. 1 showing the lugs bent slightly more but the curl not completely closed;

FIG. 7 shows a different type of lug on a glass jar from that shown in FIG. 5;

FIG. 8 shows a top of a cap;

FIG. 9 is a view similar to FIG. 8 showing the top of a cap with lugs disposed at spaced positions around it;

FIG. 10 shows the first step in forming the lug shown in FIG. 14;

FIG. 11 shows the second step for forming the lug shown in FIG. 14;

FIG. 12 is a view taken on line 12—12 of FIG. 9 showing a part of the finished cap;

FIG. 13 shows another step; and

FIG. 14 is a view taken on line 14—14 of FIG. 9 showing the finished lug.

Now with more specific reference to the drawing, FIGS. 1 to 5 show a cap 10 having an inwardly turned bead 11. The cap is generally cylindrical and cup shaped and has a liner 12 therein which may be made of paper, plastic, or other suitable material. The finished lugs 15 shown are not completely closed but extend inwardly beyond the intermediate parts of the bead 11.

The embodiments of the invention shown in FIGS. 1 to 6 and 9 to 14 show a cup shaped cap having a rim which may be formed by the same process. FIGS. 10, 11, 13, and 14 show successive stages in the development of the lugs shown in FIGS. 1 to 6.

In the first stage, the outer edge of the rim 115 is bent up from the inside on the outer cylindrical part 116 as shown in FIG. 10 so that the rim of the cap is turned in all the way around. Then the rim 115 is further curled around as shown in FIG. 11 so that it is now pointing downward away from the bottom of the cap and the part originally adjacent it at 117 is now pointing upward.

In the next stage as shown in FIG. 13, the rim 115 is slightly curled in cross section to form a circle almost completely closed. The part 117 is moved toward the center of the cap and the entire curved portion moves in and the slot adjacent the rim of the jar at 119 is pushed inwardly generally parallel to the outside 116 of the jar. This is done by supporting the lugs 120 from above and applying a force below each lug outward and between each pair of lugs outward toward the inner periphery of the rim. This will cause the lugs to take the form shown in FIG. 14. The parts intermediate the lugs will take the form shown in FIG. 12.

In FIG. 9, the parts indicated at section line 12—12 in FIG. 12 are formed with the rim 115 pushed inwardly and then curled around. Thus, in the finished lug, the rim is turned back on itself and extends inwardly at 119. It then curves sharply inwardly and then is rounded outwardly at 117 in an arcuate form. The extreme end is then turned inwardly at 115. At the position indicated at 12—12 between the lugs, the inside surface of the turned in bead is straight. Thus, the lug 120 formed by the generally annular part 117 underlies the lugs or threads 20 on the rim of a jar 21 and the parts 119 between the lugs do not interfere with these lugs on the glass jars. Therefore, to place the cap in position, the lugs formed by the annular part 117 are placed between the lugs 20 and the cap placed on the jar. Then as the cap is rotated, the lugs 20 on the jar will ride up over the lugs 120 on the cap and force the liner of the cap down into engagement with the mouth of the jar 22, forming a seal.

FIG. 5 indicates that the lugs 20 on the jar may be formed at approximately an angle indicated at A of five to ten degrees.

The lugs 220 may be formed on a jar neck having the angular portion 221 suitable to ride up over a lug such as lug 120 in the embodiment in FIG. 14 and a downwardly extending stop portion 222 at the end thereof. Thus, when the cap is put in place and rotated, the annular lugs 220 will ride under the portion 221 and come to rest on a lower part 223 against the stop portion 222.

In the embodiment of the invention shown in FIG. 6, an annular lug 317 is formed on a part 319 with an outer part 316 of the cap. The ends forming lugs 317 are bent parallel to the outer part 316 of the cap.

The view in FIG. 8 indicates the cap 110 indicated at 110′ before the lugs 120 are forced outward at the speed intervals indicated.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A method of forming lugs on a cap to cooperate with lugs on a container comprising
 providing a cup shaped cap made of bendable material,
 turning the outer edge inwardly,
 turning the inwardly turned edge back on itself to form a curl,
 forcing said curl away from the bottom of said cap at spaced places to form lugs spaced a substantial distance from the open end of said cap,
 and forcing said curl toward the inner periphery of said cap between said lugs and retaining a portion of said cap material on the side of said lugs adjacent said open end coextensive with and generally parallel to the inner periphery of said cap.

2. A method of forming a container cap comprising
 providing an open ended cup shaped cap of thin bendable material,
 bending said material back on itself toward the bottom of said cap to form a curl,
 said curl being disposed a substantial distance inwardly from the inner periphery,
 supporting said curl from movement toward said bottom at spaced positions,
 and applying radial force to said curl around the inner periphery whereby said material is moved toward the center of said cap at spaced positions to form lugs and retaining a portion of said cap material on the side of said lugs adjacent said open end coextensive with and generally parallel to the inner periphery of said cap,
 and retaining the material between said lugs being disposed in close proximity to said inner periphery.

References Cited

UNITED STATES PATENTS

| | | | |
|---|---|---|---|
| 2,089,954 | 8/1937 | Gibbs | 113—121 |
| 2,275,220 | 3/1942 | Enkur | 113—121 |
| 2,302,542 | 11/1942 | Gibbs | 113—121 |

CHARLES W. LANHAM, *Primary Examiner.*

R. D. GREFE, *Assistant Examiner.*